United States Patent [19]
Blate et al.

[11] 3,726,375
[45] Apr. 10, 1973

[54] INFLATED ESCAPE RAMPS

[75] Inventors: Steven W. Blate, Akron; Donald B. Tschudy, Canton; Robert S. Ross, Northfield Center; Fred W. Mellor, Akron; Harry T. Kifor, Canton; William C. Davidson, Cuyahoga Falls, all of Ohio

[73] Assignee: Goodyear Aerospace Corporation, Akron, Ohio

[22] Filed: Mar. 8, 1971

[21] Appl. No.: 121,954

Related U.S. Application Data

[63] Continuation of Ser. No. 753,351, Aug. 19, 1968, abandoned.

[52] U.S. Cl. .................................. 193/25 B, 182/48
[51] Int. Cl. ............................................ B65g 11/10
[58] Field of Search .............................. 193/25, 25 B; 244/137; 182/48; 52/2

[56] References Cited

UNITED STATES PATENTS

| | | | |
|---|---|---|---|
| 2,830,606 | 4/1958 | Daugherty | 52/2 |
| 3,137,307 | 6/1964 | Scurlock | 52/2 |
| 3,247,627 | 4/1966 | Bird | 52/2 |
| 3,458,009 | 7/1969 | Favors | 182/48 |
| 3,466,685 | 9/1969 | Robinsky | 52/2 X |
| 3,476,338 | 11/1969 | Fisher | 193/25 B X |
| 3,473,641 | 10/1969 | Fisher | 193/25 B |

FOREIGN PATENTS OR APPLICATIONS

| | | | |
|---|---|---|---|
| 966,233 | 8/1964 | Great Britain | 193/25 |

*Primary Examiner*—Richard E. Aegerter
*Assistant Examiner*—Douglas D. Watts
*Attorney*—J. G. Pere

[57] ABSTRACT

The invention comprises an inflatable ramp particularly designed to serve as an escape or a discretionary ramp for association with aircraft usage in an emergency type situation. The convex shaped lobes on the ramp serve as omniangle steps regardless of the angle of the ramp with the relationship to the horizontal, wherein the entire ramp is packageable within the aircraft structure. The specific construction of the ramp utilizing dual wall thread connected inflatable fabric is important to the operational structure of the invention, and to the fabrication of the ramp which will have sufficient strength to withstand passenger traffic or other loading when deplaning without collapsing, and in addition permit reentry into the plane cabin. It can further be used for deplaning injured people confined to stretchers and so forth.

9 Claims, 11 Drawing Figures

PATENTED APR 10 1973 3,726,375

INVENTORS
STEVEN W. BLATE
WILLIAM C. DAVIDSON
HARRY T. KIFOR
FRED W. MELLOR
ROBERT S. ROSS
DONALD B. TSCHUDY
BY: Oldham & Oldham
ATTORNEYS

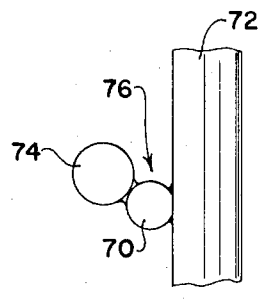
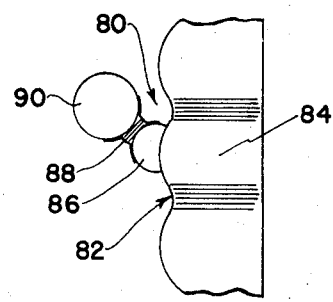
FIG.-8  FIG.-9
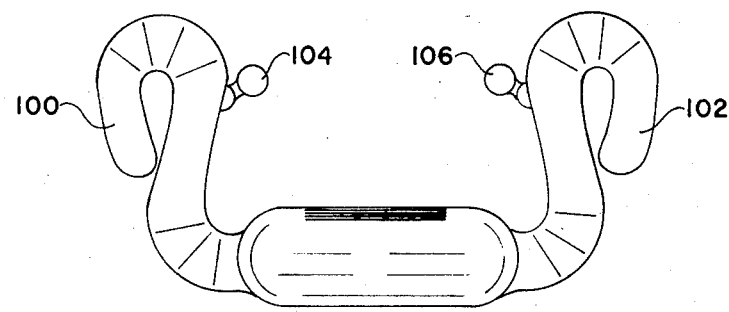
FIG.-10
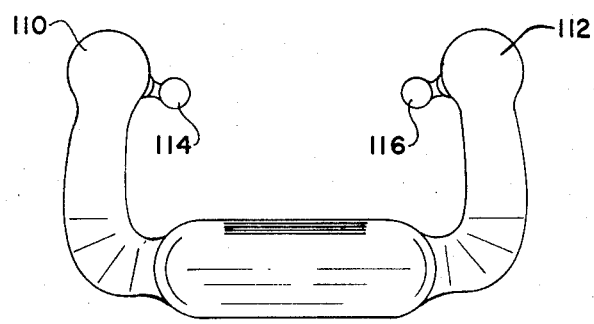
FIG.-11

INFLATED ESCAPE RAMPS

This is a continuation of application Ser. No. 753,351 filed Aug. 19, 1968 now abandoned.

Heretofore it has been well known that one of the major causes of human casualty in aircraft crashes is not that the persons are killed upon the crash, but are killed by the subsequent fire which envelopes the fuselage. Hence, rapid means of escape from the fuselage is important to the preservation of human life. Heretofore, these attempts have been made by chute type escape ramps which can be quickly dropped from the plane and allow people to slide in a sitting position from the plane to the ground. However, these chutes are difficult to stabilize, and are not readily adaptable to various angles that they may take with relation to the ground depending upon the height of the aircraft over the ground at the time of use. Further, if the angle is steep, the persons sliding are quite susceptible to sustaining considerable injury on the chute or when they hit the ground at the end of the slide. A type of ramp that can be inflated and used for emergency purposes which will allow the persons to walk down the ramp or move rapidly in an upright position with a great deal of stability or reenter even at very steeply inclined angles is needed by the art.

Therefore, it is the general object of the present invention to provide an inflatable ramp particularly designed to be utilized as an escape or discretionary ramp for aircraft in a crash-type situation where the ramp is designed to work at various angles with relation to the aircraft, and to allow the persons to deplane by walking down the ramp in an upright position rather than sliding.

The aforesaid objects of the invention and other objects which will become apparent as the description proceeds are achieved by providing an inflatable escape device which comprises an elongated, wide, and relatively flat ramp made from dual wall thread connected inflatable fabric, and a plurality of uniformly spaced, raised, substantially convex steps extending transversely the length of the ramp and formed integrally to the top surface of the ramp by controlling the length and position of the threads connecting the dual walls of the fabrics.

For a better understanding of the invention reference should be made to the accompanying drawings wherein:

FIG. 8 is a reduced size, cross-sectional illustration of a handrail attached to the side wall;

FIG. 9 is a modified embodiment of another handrail attached to the side wall;

FIG. 10 is an end elevation showing a modified embodiment of the ramp utilizing side walls without a top, where the side walls are curled back on themselves at their upper edges for strengthening purposes; and FIG. 11 is an end elevational view of a modified embodiment of the invention utilizing side walls with upper edges having increased thickness to enhance the strength characteristics thereof.

Figure 1:
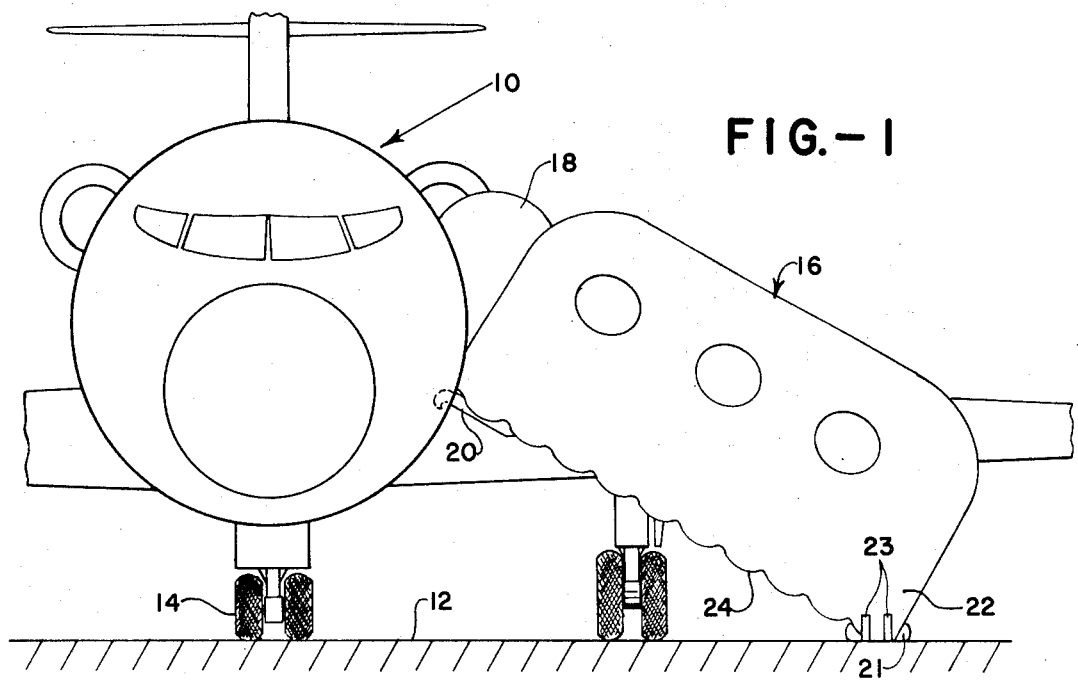
FIG. 1 is a side elevation of the ramp in position in association with an aircraft showing how it extends down from the aircraft to the ground in its emergency extended position.

With reference to the embodiment illustrated in FIG. 1 of the invention, the numeral 10 indicates generally an aircraft which has crash landed onto the ground 12, and is supported on its nose wheel 14. An inflatable ramp indicated generally by numeral 16 has been deployed from the side of the aircraft 10 with one end mounted and connected to the side of the aircraft 10 by a connecting panel 18 mounted with a girt 20 attached to the fuselage. The other end of the ramp 16, at 22, rests on the ground 12. In order to provide additional support to the end 22 of the ramp 16 and transfer load from the base to the sides, support cylinders 21 are attached by straps 23 extending therearound to connect the bottom to the sides of the ramp 16. The instant invention does not include the packaging configuration nor the means to achieve inflation and deployment of the ramp with respect to the aircraft, but only contemplates that any suitable means to package and deploy the ramp will be utilized. This invention is concerned with the construction of the ramp itself, be it in the inflated or deflated condition, and how it provides a safer and more efficient deplaning ramp for emergency situations than those chutes or slides heretofore provided.

Figure 2:
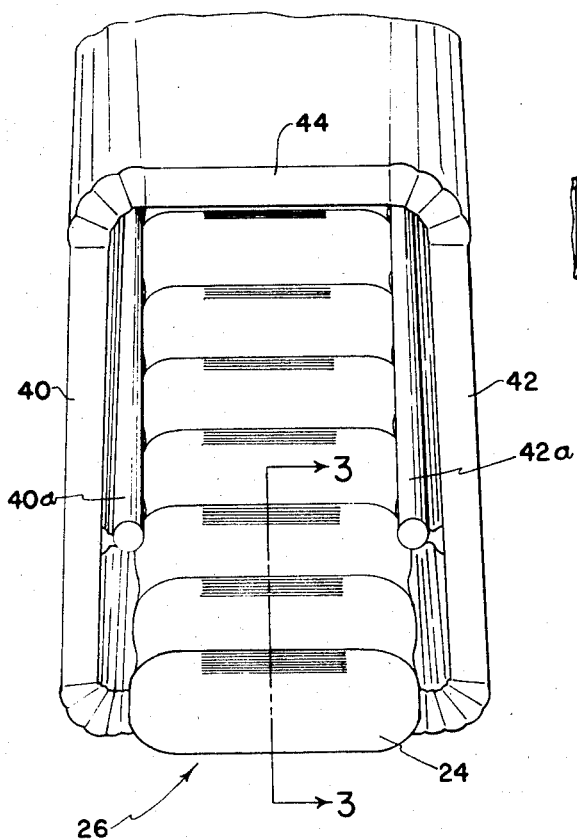
FIG. 2 is a greatly enlarged, partially broken-away end elevation of the ramp showing the lobe step configuration of the ramp in an inclined position as it would look to a person about to enter from the bottom end thereof.

A unique feature of the invention is achieved in the actual construction of the ramp itself by providing a plurality of raised convex or curvate surfaces, lobes, or steps 24 as seen in both FIGS. 1 and 2. The lobes 24 provide steps for persons to walk down the ramp wherein the angle of the ramp with respect to the horizontal does not change or effectively alter the usefulness of the steps 24 since they are substantially semicircular and hence present the same surface relation regardless of the angle of the ramp with respect to the horizontal. In essence, the ramp 16 comprises an elongated wide relatively flat bed or base, indicated generally by numeral 26, which is effectively contoured on at least the top surface thereof to provide the lobes or steps 24 referred to above. Normally, the invention contemplates that the base or bed 26 will be made from dual wall thread connected inflatable fabric as made by Goodyear Aerospace Corporation of Akron, Ohio, under the trade name "Formdair," whereby the lobes or steps 24 can be formed as an integral contour of the base 26 by suitable adjustment of the length of the drop threads connecting the dual wall fabric.

Figure 3:
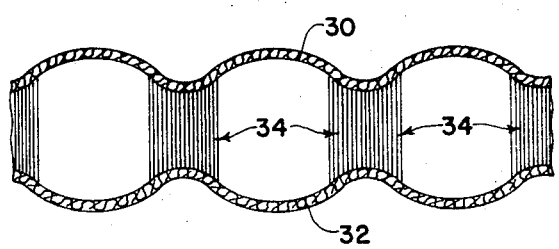
FIG. 3 is a cross-sectional view of the lobe portion of the basic ramp taken on line 3—3 of FIG. 2.

This structural configuration is shown most clearly in FIG. 3 where a top fabric 30 is connected to a bottom fabric 32 by a plurality of drop threads indicated generally by numeral 34. The contour to provide the lobes 24 is achieved by varying the length of the drop threads connecting the fabrics 30 and 32. As is quite evident from the showing in FIG. 3, the drop thread lengths are variably adjusted so as to effectively provide substantially circularly shaped lobes 24 with a smooth and continuous reversing contour in the connecting sections between the adjacent lobes. In this manner, the strain on adjacent drop threads 34 is always substantially the same so that no points of high stress are present in this structural configuration. The invention contemplates that a suitable material for the drop threads 34 and the fabrics 30 and 32 would be Nomex, a high temperature nylon fire resistant material as made by E. I. Du Pont De Nemours & Co., of about 200 lbs. tensile strength.

In order to give the passengers deplaning on the ramp of the invention assurance of safety, and to prevent the possibility of them falling or sliding down the ramp, the invention provides sidewalls 40 and 42, again also made from dual wall thread connected inflatable fabric and connected integrally to the edges of the base or bed 26 along substantially the full length thereof, as is clearly evident from FIG. 1. Also, each of the side walls has a longitudinally extending handrail 40a and 42a, respectively extending the length thereof to assist passenger safety. The preferred embodiment of the invention incorporates a top 44, also made from an inflatable fabric connecting the sides 40 and 42 along its adjacent edges and again the contours in the top and sides are achieved by the weaving technique of Formdair by controlling the length of the drop yarns to achieve the desired configuration.

Figure 5:
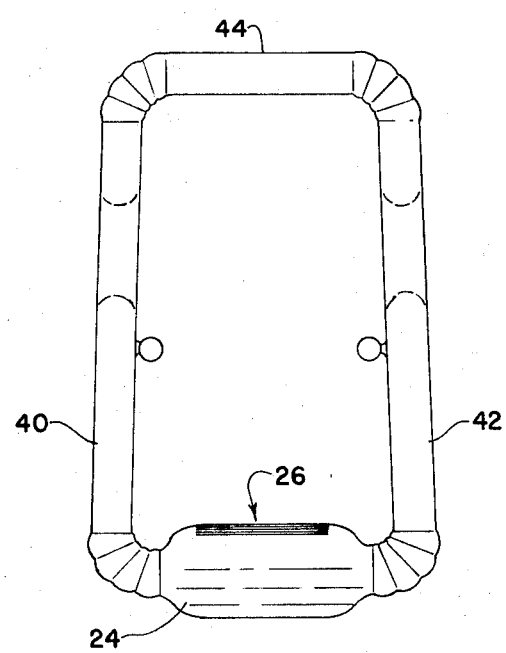
FIG. 5 is a reduced size end elevation of the ramp in a horizontal position showing the size of the sides, the side windows, and the top in relation to the lobed ramp portion.
Figure 7:
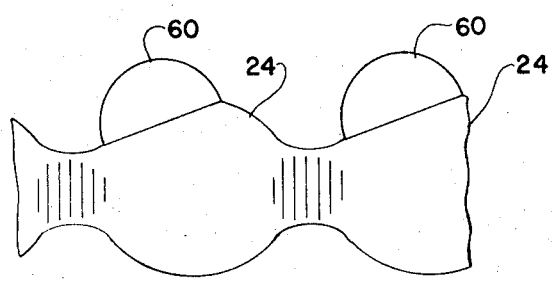
FIG. 7 is a cross-sectional illustration of a modified lobe embodiment of the invention to more fully simulate a normal 90° angle step configuration.

FIG. 5 more clearly illustrates the cross-sectional configuration of the escape ramp as a whole and shows that the top 44 is the same width as the bottom or bed 26. A taper of the side walls 40 and 42 into an "A" shaped or "∩" shaped configuration can also be given to the ramp. FIG. 5 also illustrates how the windows look in relation to the sides, which likewise is clearly evident from the side view of FIG. 1. The windows are optional, of course, but have been found to give a deplaning passenger some better sense of orientation with respect to the surrounding terrain, and thus not make deplaning passengers perhaps afraid to hurry down the steps to safety. They further permit escape from the ramp if ever necessary.

Figure 4:
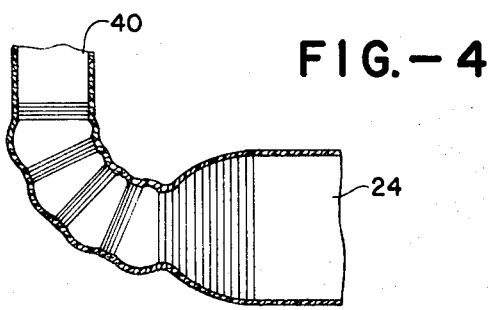
FIG. 4 is an enlarged, cross-sectional illustration showing the side edges of the lobe connecting to the sides of the ramp, and the drop thread configuration between the dual fabrics to achieve this contoured relationship.

FIG. 5 illustrates rather clearly, as is also shown in FIG. 2, that the side walls 40 and 42 and top 44 are of considerably less thickness than the lobes 24 of base or bed 26. Naturally, this causes some problem in connecting the base or bed 26 to the side walls 40 and 42. Essentially, this connection is achieved by varying the length of the drop yarns between the side walls and the lobes 24. This actual relation of the drop yarns to the dual wall fabric is shown in FIG. 4 of the drawings between the side wall 40 and a lobe 24. Again, the appropriate variation in the length of the drop yarns is quite important to prevent the formation of local stress or cause too much loading on any particular drop yarn, which naturally would cause it to fail, and thus provide a progressive failure of the drop yarn connection between the fabrics.

The calculation of the length for each drop thread in achieving the contoured configuration between the base, lobes, sides, and top may be achieved by a vectorial analysis much the same as the length of the vertical suspension cables are determined in a suspension bridge, this of course being done to give nearly uniform loads in each suspension member at the designed inflated and loaded condition of the ramp. This careful determination of the drop yarn lengths improves the basic structure of an interrupted deep "Formdair" restrained strip which might be utilized to provide lobes in such a way as to make each drop thread carry an equal load to give a better and more uniform construction while loaded and at the same time retain in the overall construction a maximum of full stability while inflated and flexibility while deflated, as well as leakproof joint construction, because there will be no undue strain at any particular location.

Figure 6:
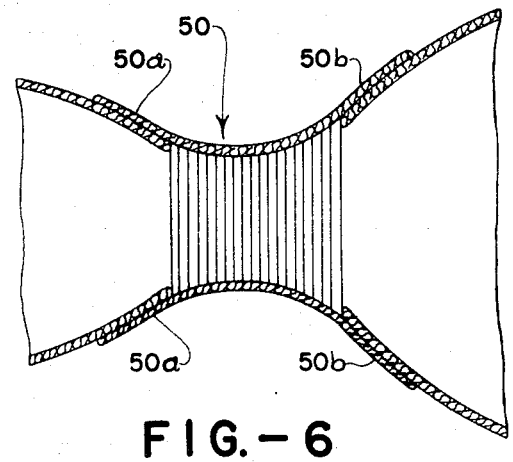
FIG. 6 is an enlarged, cross-sectional illustration of the connection between the ramp lobes and the side walls utilizing a flanged mat for such connection.

FIG. 6 illustrates a modified embodiment of the invention for connecting the lobe 24 to the side. This is in the form of a flanged dual wall inflatable fabric, indicated generally by numeral 50 which has lapping extensions 50a and 50b on each side thereof which may be adhesively or otherwise suitably secured to the respective side or lobe. Normally, the number of drop threads in the flanged section 50 will be greater than in the lobe or side so as to give a maximum strength at the point of this contoured joining. There are many adhesives presently available on the market that will give an extremely strong bonded relationship to the extended flaps, and if this form of construction is carefully undertaken, it can be accomplished more quickly, and at less expense than the totally woven configuration shown in FIG. 4.

Naturally, the flange mat sections 50 can be from a straight or curved or tapered "Formdair" stock which simply include attachment flaps at each edge. This type of flanged connection in the building of restrained pressure vessels provides the advantages of a much more foldable web intersection, a lighter weight system, and greater ease of fabrication. The flanged mat construction also permits consideration of the use of many more restraining webs or sections of various configuration to join large "Formdair" sections resulting in a superior restrained pressure vessel structure.

In order to provide a more truly step like configuration to the ramp, additional smaller convex lobes 60 might be provided on top of the basic lobe 24 with the use of drop threads or web restraint as shown, if this is selectively desired. In fact, a plurality of such lobes of increasingly smaller size would eventually approximate an exact 90° relationship between adjacent lobes very similar to a normal step construction. Of course, it is also possible to form the "Formdair" with the variable length drop threads to a 90° step relation directly, although this limits the omni-angle usage of the ramp.

FIGS. 8 and 9 illustrate modified embodiments for mounting hand rails to the side wall so as to have finger room between the edge of the hand rail and the side wall. FIG. 8 achieves this by positioning a first tubular member 70 attached on one side thereof to the side wall 72, and then positioning a second tubular member 74 in the upper outer quadrant thereof so that there is a spaced relationship as at 76 between the member 74 and the side wall 72 to allow one to firmly grasp the member 74 with his fingers and use this as a hand rail. The invention contemplates that both tubular members 70 and 74 will be pressure inflated through appropriate holes in communication with the pressure in side wall 72.

The configuration of FIG. 9 is quite similar except that the side wall is actually restrained at 80 and 82 with appropriate shorter drop threads so as to provide a lobe or small node 84 to which a first pressurized tubular member 86 is attached. A reduced diameter connecting portion 88 might be utilized to connect a second pressurized tubular member 90 to tube 86 in spaced relationship so as to allow an individual to firmly grasp the outer member 90 with his hand and fingers.

FIGS. 10 and 11 represent modified embodiments of the side walls without the use of a top, but with the same basic ramp configuration of the invention. In FIG. 10, the side walls are folded back onto themselves at 100 and 102 to give an enlarged strengthening configuration to the upper edges so as to prevent buckling. Note the position and configuration of hand rails 104 and 106. In the configuration of FIG. 11, the upper edges of the side walls are enlarged at 110 and 112, this being done by appropriately varying the length of the drop yarns in this inflatable "Formdair" material, to provide an enlarged and strengthened portion along the upper edge of the side walls. Again a modified mounting embodiment for hand rails 114 and 116 is illustrated.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. An inflatable ramp for attachment to an aircraft which comprises
an elongated, wide, and relatively flat ramp made from dual wall inflatable fabric, means connecting the fabric, and a plurality of spaced raised curvate steps of sufficient size and spacing to conform for use by human beings, said steps extending transversely to the length of the ramp and formed integrally into the top surface of said ramp by controlling the length and position of the means connecting the walls of the fabric, means for attaching one end of the ramp to an aircraft fuselage adjacent an exit thereof, and inflatable sidewalls attached along the lateral edges of the ramp and extending upwardly to provide support for the ramp and human beings using same.

2. An inflatable ramp according to claim 1 where attaching means are provided at one end thereof to connect the ramp to a structure from which it can extend, and includes reinforcing means at the other end of the ramp to support that end of engagement with the surface of the ground.

3. An inflatable ramp according to claim 2 which includes sides made from a dual wall inflatable fabric extending vertically from each edge of the ramp and running substantially the full length thereof, said sides being connected to the ramp by connections allowing transfer loading from the ramp to the sides.

4. A ramp according to claim 3 where the sides are not as thick when inflated as the ramp but have a widened and strengthened top edge to prevent buckling thereof.

5. A ramp according to claim 4 where the top edge of each side curls back on itself to provide the widened and strengthened relationship.

6. A ramp according to claim 4 where threads connect the dual wall fabrics of the sides and the dual wall fabrics of the ramp and are appropriately varied in length to achieve a gradual and symmetrical change of contour from the ramp to the sides and between the raised steps of the ramp without putting undue strain on any of the threads.

7. A ramp according to claim 4 where the sides are connected to the ramp with short connecting dual wall thread connected flanges with the fabric thereof overlapping the fabric of the walls and ramp and adhesively secured thereto, and where the threads of the flanges are appropriately varied in length to provide a contour between the fabrics thereof and a smooth contour between the sides and the ramp.

8. An inflatable ramp according to claim 1 which includes a top connecting the sides and holding the sides in spaced and stabilized relation to the ramp.

9. An inflatable ramp according to claim 1 which includes additional smaller convex inflatable lobes attached to the surface of each step to provide a larger stepping surface for use by human beings.

* * * * *